Figure 1:
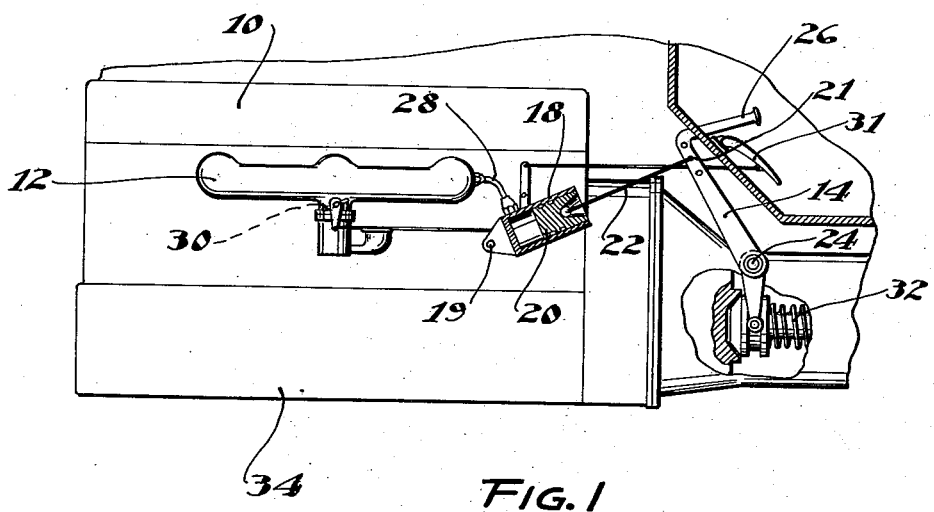

June 22, 1937.  C. S. BRAGG ET AL  2,084,380
CLUTCH RELEASE MECHANISM
Filed June 1, 1931

INVENTOR.
CALEB S. BRAGG
BY VICTOR W. KLIESRATH
ATTORNEYS.

Patented June 22, 1937

2,084,380

UNITED STATES PATENT OFFICE 2,084,380

CLUTCH RELEASE MECHANISM

Caleb S. Bragg, Palm Beach, Fla., and Victor W. Kliesrath, Port Washington, N. Y., assignors to Bragg-Kliesrath Corporation, Long Island City, N. Y., a corporation of New York Application June 1, 1931, Serial No. 541,204

7 Claims. (Cl. 192—.01)

This invention relates to power operated mechanism, and more particularly to the clutch mechanism of an automotive vehicle.

The increasingly heavy vehicles of the day give rise to new problems in operation and control of their manifold mechanisms. By way of example, we have the massive trucks and busses with their high horsepower motors, necessitating stronger clutch springs and more effective brakes. Such mechanisms necessarily impose upon the driver an appreciably greater physical effort, and it is with a view to reducing this effort that the present invention is designed.

The principal object of the invention is to provide a means for relieving the operator of an appreciable portion of the clutch control effort, and to this end there is suggested the employment of an engine operated servo motor, automatic in its action, the driving element of the motor being so designed and so connected to the conventional clutch pedal as to impose a clutch releasing load upon the pedal when the engine is idling.

It is a further object, however, to so design the aforementioned parts that the mechanism falls short of releasing the clutch with an idling engine motor. With such a construction the actual release of the clutch is effected in the usual fashion by the driver, a very small amount of force being necessary, however, owing to the supplemental effect of the servo motor.

In the attainment of the above objects there is suggested a vacuum operated fluid motor, the casing of which is preferably pivotally secured to a rigid member, such as the engine casing, the piston of the motor being secured to the clutch pedal and tending to actuate the latter at closed throttle. The motor is preferably placed in circuit with the intake manifold of the engine, the latter providing a source of power to energize the motor, which power is proportional to the degree of the throttle opening.

A further feature of our invention lies in the manner of controlling the engagement of the clutch mechanism, it being, of course, desirable to relieve the operator of a part of the clutch spring load during the clutch engagement. This result is automatically attained as the throttle valve is opened, the degree of rarefication within the servo motor being progressively decreased as the valve is opened.

In somewhat similar clutch control mechanism heretofore designed, such for example, as disclosed in Woolson Patent No. 1,635,873, dated July 12, 1927, it has been suggested to employ a separate control valve for the servo motor, which valve is usually manually controlled through the intermediary of the engine throttle control means. Such a structure, however, defeats satisfactory operation because in every instance the motor is vented to the atmosphere through the control valve before the throttle valve can be sufficiently opened to effectively accelerate the engine. The result is that the operator almost instantly has the entire burden of the clutch spring thrust upon his foot which naturally tends to force his foot rearwardly and engage the clutch. This results in stalling the motor, if the throttle is not sufficiently open, or in starting the car with a jerk, if the throttle is opened more quickly. The only manner in which the operator can avoid this action is to brace himself for the expected additional load when the throttle valve is opened.

With our device, however, this undesired result is obviated due to the progressive cutting out of the servo motor, which action is a function of the degree of throttle control and is furthermore wholly dependent on said control. Should the throttle be opened slowly there is no appreciable load transferred to the foot of the operator which would tend to engage the clutch too quickly and stall the motor.

A further object of our invention is to provide means for supplementing the effect of the conventional clutch spring in its normal function of pressing the clutch plates together, and to this end there is suggested means such as a supercharger for progressively increasing the engine manifold pressure above atmospheric as the throttle is opened, together with a servo motor in unimpeded circuit with the manifold and connected to operate the clutch plates, the effect of the motor being thus progressively increased in aiding the clutch engagement.

Further objects of the invention are to provide an economical type of servo mechanism from the manufacturing, installation and service standpoints, and one which will compensate for both the space limitations of the conventional throwout clutch lever as well as the physical effort limitations referred to supra.

In order that the invention in its various aspects may be readily understood and appreciated by those skilled in the art, several phases of the invention are set forth hereinafter by way of description and exemplification in the accompanying drawing. It will be readily appreciated, however, that the description and drawing are illustrative only and are not to be taken in an unnecessarily limiting sense.

Figure 2:
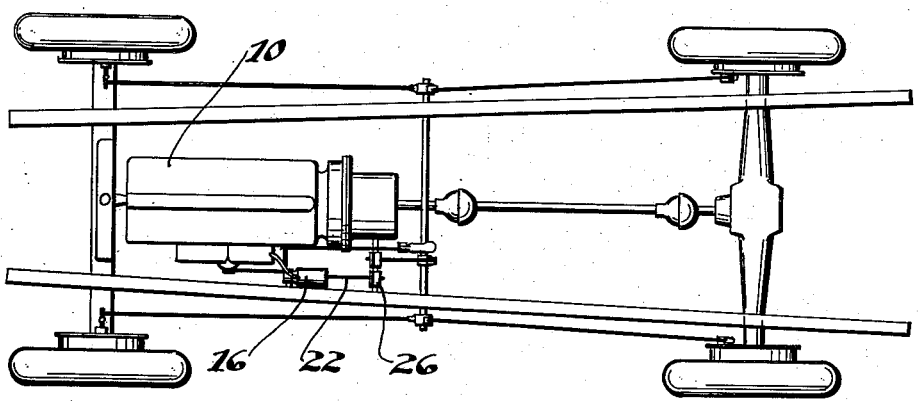
Figure 3:
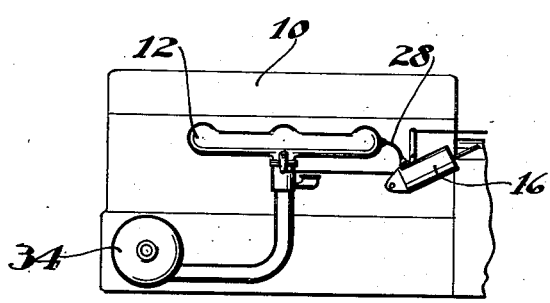

In the drawing, Figure 1 is a fragmentary side elevation of an automotive vehicle disclosing our novel power means for operating the clutch mechanism;

Figure 2 discloses diagrammatically and in plan our novel power mechanism together with the throttle control means with which it cooperates; and Figure 3 is a view similar to Figure 1 with the inclusion of a supercharger.

Referring now to the invention disclosed in Figure 1, there is provided, in combination with the conventional internal combustion engine 10 with its intake manifold 12 and the conventional manually operated clutch throw-out lever 14, a power mechanism cooperating with both clutch and engine in a manner to be described in detail hereinafter.

The power unit comprises a fluid-operated motor 16 including a cylinder or casing 18 preferably, though not necessarily, pivotally secured at its closed end 19 to the engine case or other convenient mounting rigidly secured to the chassis. The piston 20 of the motor is provided with the usual connecting rod 22, the latter being pivotally secured at 21 to the clutch throwout lever 14 intermediate its fulcrum or pivotal mounting 24 and foot pad 26. A conduit 28 serves to connect the interior of the motor with the intake manifold between the throttle 30 and engine cylinders. The usual accelerator pedal 31 is provided for operation of the throttle 30.

Normal operation of the clutch throw-out lever 14 entails considerable effort on the part of the driver, particularly in view of the very heavy clutch spring 32 of the large busses and trucks. This spring is necessarily heavy in order to maintain the clutch plates engaged during the rapid transmission of the large amount of energy from the engine crank shaft to the drive shaft. The stop light traffic control now in vogue also incurs prolonged periods of clutch disengagement, an appreciable fatigue of the driver ensuing.

The servo motor disclosed in Figure 1 is, however, designed to reduce this effort on the part of the car operator. At closed throttle there exists a partial vacuum in the engine manifold between the throttle and the engine cylinders, this condition existing by virtue of the pumping action of the cylinders. The servo motor, being at all times in communication with this point in the manifold, is, therefore, automatically energized when and if for any reason the throttle is closed. This energization of the motor is, of course, due to the pressure differentials set up between opposite sides of the piston 20, the inner side being subjected to the rarefication of the manifold and the outer side being subjected to the existing atmospheric pressure.

The piston is thus automatically subjected to a force placing the rod 22 in tension, whenever the throttle valve is closed and the engine pistons are turning over, the degree of rarefication being a function of the position of the throttle.

The object of the invention, however, is to supplement the effort necessary to disengage the clutch without at any time automatically effecting the disengagement or, in other words, taking the control away from the driver. To this end, either or both the area of the piston 20 and/or the point of engagement of the rod 22 and the lever 14 is/are so determined as to tend to, but not actually, disengage the clutch at the differential of pressure existing during the idling of the engine. The idling position of the throttle, the area of the piston 20 and the servo motor mechanical advantage of the lever 14 are all variables which may be adjusted to effect the desired condition.

The maximum load from the servo motor is thus imposed upon the clutch release lever when the engine is operating at closed throttle, the load being predetermined to just fall short of slipping the clutch. It is at such a time that the driver usually wishes to disengage the clutch in order to shift the gears, whereupon it is merely necessary for him to apply a comparatively slight physical effort at the pedal pad 26. The power and physical effort in moving the lever are then concurrent. After the shift is made the throttle is opened and the clutch is progressively engaged, the servo motor being automatically and progressively cut out with increasing throttle.

This is true inasmuch as the rarefication within the manifold and consequently the motor is decreased proportionately with the opening of the throttle valve, and should the throttle be opened slowly the power of the motor serves to relieve the operator during the clutch engagement. It is to be noted that the effect of the servo motor is a maximum when the driving torque of the engine is a minimum and vice versa, the effect of the servo motor is a minimum when and if the engine torque is a maximum; this, however, is exactly the condition desired to obviate an automatic power clutch release or clutch slipping action. The degree of the power effect with the consequent timing of the driving engagement of the clutch plates is, therefore, a function of the throttle control. The clutch movement may thus be graduated to effect a smooth engagement by the concurrent decreasing effect of both the power and manual effort.

As a further aspect of our invention, there may be provided means for supplementing the clutch spring 32 in its function of keeping the plates in non-slipping engagement. To this end a supercharger 34 (Figure 3) is provided, which adjunct functions as the throttle is opened to progressively increase the manifold pressure resulting in a superatmospheric pressure. With the mechanism disclosed, the piston 20 is thus impelled outwardly to increase the load upon the clutch plates, and this load progressively increases in direct proportion to the degree of superatmospheric pressure; but this is precisely the end desired inasmuch as maximum clutch plate load is necessary at the time of maximum engine torque to obviate a slipping clutch, and such a load is imposed at wide open throttle.

There is thus provided an exceedingly simple, effective and economical power or booster mechanism which functions at all times as a clutch spring regulator to aid the operator during all phases of the clutch control.

It will be understood that while the illustrated embodiments of the invention are described as shown, a considerable latitude is to be permitted in construction within the range of the claims.

We claim:

1. An automotive vehicle comprising, in combination with a clutch including means for keeping the clutch in engagement, an angularly movable clutch pedal, an internal combustion engine, a throttle for said engine, and manually operable means for operating said throttle, a pressure differential operated motor, the movable element of which is operatively connected with the clutch mechanism, an unimpeded fluid transmitting connection between said motor and the intake manifold at a point between the carburetor and the pistons of the engine, and means for creating a superatmospheric pressure in said manifold under the control of said throttle, whereby with fluctuations of the gaseous pressure within the manifold incurred by the operation of the throttle there automatically ensues corresponding fluctuations of the gaseous pressure within the clutch motor to energize said motor and supplement the aforementioned means for maintaining the clutch engaged.

2. An automotive vehicle comprising an engine, engine controlling means, a clutch, means for engaging the clutch, a pressure differential operated motor, means positively interconnecting said motor and clutch whereby the clutch may be engaged by said motor, and means interconnecting said motor and engine whereby with operation of the engine controlling means to speed up the engine the motor is energized to supplement the first mentioned clutch engaging means to maintain the clutch in engagement.

3. An automotive vehicle provided with a clutch, means for maintaining the clutch in engagement, an intake manifold, means for varying the gaseous pressure within said manifold comprising a supercharger, a pressure differential operated motor operably connected with the clutch, means interconnecting said manifold and motor, and control means for said motor operable to energize the same whereby the motor supplements the first mentioned clutch engaging means in maintaining the clutch tightly engaged.

4. An automotive vehicle provided with an engine and a clutch, the latter having a conventional clutch spring normally operative to maintain the clutch engaged at a predetermined load, an engine operated pressure differential operated motor operably connected to the clutch to aid the clutch spring in engaging the clutch by additionally loading the clutch, and a common means for controlling the operation of said engine and motor.

5. An automotive vehicle provided with a supercharger, a clutch mechanism including means for engaging the same, means for engaging the clutch to supplement the aforementioned clutch engaging means, and pressure differential operated means operably connected to the clutch and operable by said supercharger.

6. An automotive vehicle comprising an intake manifold as a source of variable gaseous pressure, and further comprising a clutch, said clutch including means for maintaining the same engaged at a predetermined load, a pressure differential operable motor operably connected with the clutch, an unimpeded fluid transmitting connection interconnecting said manifold and motor, the aforementioned mechanism being so constructed, proportioned and arranged that the motor, when energized in one manner by virtue of its connection with the manifold, functions as an underrated power means insufficient of itself to disengage the clutch and, when energized in another manner serves to aid the first-mentioned means in maintaining the clutch engaged.

7. An automotive vehicle provided with an engine, a supercharger, a transmission and a clutch serving to interconnect the engine and transmission, said clutch including means for engaging the same, and means for engaging the clutch to supplement the aforementioned clutch engaging means comprising a pressure differential operated means operably connected to the clutch and operable by said supercharger.

CALEB S. BRAGG.
VICTOR W. KLIESRATH.